United States Patent
Tesanovic

(10) Patent No.: US 11,864,085 B2
(45) Date of Patent: Jan. 2, 2024

(54) METHOD AND APPARATUS FOR TRANSMITTING DATA TO A NETWORK NODE IN A WIRELESS COMMUNICATION SYSTEM

(71) Applicant: Samsung Electronics Co., Ltd., Suwon-si (KR)

(72) Inventor: Milos Tesanovic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,417

(22) Filed: Apr. 30, 2020

(65) Prior Publication Data
US 2020/0351749 A1 Nov. 5, 2020

(30) Foreign Application Priority Data
May 2, 2019 (GB) .................................... 1906212

(51) Int. Cl.
*H04W 40/22* (2009.01)
*H04W 28/02* (2009.01)

(52) U.S. Cl.
CPC ....... *H04W 40/22* (2013.01); *H04W 28/0268* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 2007/0072604 A1* | 3/2007 | Wang | H04L 47/24 455/428 |
| 2007/0280258 A1* | 12/2007 | Rajagopalan | H04L 45/72 370/395.3 |
| 2009/0129323 A1 | 5/2009 | Chen et al. | |
| 2010/0157888 A1 | 6/2010 | Aggarwal et al. | |
| 2011/0019669 A1* | 1/2011 | Ma | H04L 45/124 370/389 |
| 2013/0322457 A1* | 12/2013 | Budhia | H04L 45/66 370/401 |
| 2014/0169265 A1 | 6/2014 | Park et al. | |

(Continued)

FOREIGN PATENT DOCUMENTS

| | | | |
|---|---|---|---|
| CN | 110475267 | * | 5/2018 |
| CN | 111865802 B | * | 4/2019 |

(Continued)

OTHER PUBLICATIONS

3GPP TR 38.874 V16.0.0 (Dec. 2018), Study on Integrated Access and Backhaul (Year: 2018).*

(Continued)

*Primary Examiner* — Andre Tacdiran

(57) ABSTRACT

A method of operating a first node in a wireless communication network is provided. The method comprises: receiving an ingress data packet; determining routing; and transmitting the ingress data packet. Determining routing may comprise determining a next hop node for the ingress data packet taking account of first level routing information indicating target next hop nodes. Alternatively, determining routing may comprise determining, for a target next hop node, a channel on which to transmit the ingress data packet taking account of second level routing information.

14 Claims, 7 Drawing Sheets

(56) References Cited

U.S. PATENT DOCUMENTS

| | | | |
|---|---|---|---|
| 2016/0154756 A1* | 6/2016 | Dodson | G06F 13/4022 |
| | | | 710/316 |
| 2017/0188400 A1* | 6/2017 | Tian | H04W 28/08 |
| 2018/0092139 A1 | 3/2018 | Novlan et al. | |
| 2018/0159702 A1* | 6/2018 | Song | H04L 45/583 |
| 2018/0337846 A1* | 11/2018 | Lee | H04L 45/02 |
| 2019/0007185 A1* | 1/2019 | Cao | H04W 72/048 |
| 2019/0098673 A1* | 3/2019 | Goyal | H04L 12/1863 |
| 2020/0120725 A1* | 4/2020 | Mildh | H04W 76/12 |
| 2020/0314014 A1* | 10/2020 | Calciu | H04L 41/147 |
| 2020/0351750 A1* | 11/2020 | Majmundar | H04W 40/22 |
| 2020/0351930 A1* | 11/2020 | Luo | H04W 72/1242 |
| 2020/0382982 A1* | 12/2020 | Yao | H04W 40/22 |
| 2021/0014768 A1* | 1/2021 | Hong | H04W 40/22 |
| 2021/0092667 A1* | 3/2021 | Zhu | H04W 28/0268 |
| 2021/0126991 A1* | 4/2021 | Huang | H04W 72/04 |
| 2021/0235291 A1* | 7/2021 | Byun | H04W 40/12 |
| 2021/0377930 A1* | 12/2021 | Liu | H04W 72/0406 |

FOREIGN PATENT DOCUMENTS

| | | | |
|---|---|---|---|
| CN | 110505160 | * | 11/2019 |
| CN | 111727662 | * | 9/2020 |
| CN | 109842440 | * | 8/2021 |
| EP | 3813320 A1 | | 4/2021 |
| EP | 3813460 A1 | | 4/2021 |
| JP | 2014138215 A | | 7/2014 |
| WO | 2018/212845 A1 | | 11/2018 |
| WO | 2019/139524 A1 | | 7/2019 |
| WO | 2019/141356 A1 | | 7/2019 |

OTHER PUBLICATIONS

Huawei et al., "Routing function and configuration", 3GPP TSG-RAN WG2 meeting #105bis, Apr. 8-12, 2019, R2-1905115, 6 pages.

ZTE Corporation et al., "Consideration on Routing in IAB", 3GPP TSG-RAN WG2 #105bis, Apr. 8-12, 2019, R2-1904601, 4 pages.

"3rd Generation Partnership Project; Technical Specification Group Radio Access Network; NR; Study on Integrated Access and Backhaul; (Release 16)", 3GPP TR 38.874 V16.0.0 (Dec. 2018), 111 pages.

Ericsson, "Backhaul Link Identifier for Packet Forwarding in IAB Networks", 3GPP TSG-RAN WG2 Meeting #105bis, Apr. 8-12, 2019, R2-1903959, 3 pages.

Notification of Transmittal of the International Search Report and the Written Opinion of the International Searching Authority, or the Declaration dated Aug. 26, 2020 in connection with International Patent Application No. PCT/KR2020/005634, 12 pages.

Search Report dated Oct. 17, 2019 in connection with United Kingdom Patent Application No. GB1906212 4, 2 pages.

United Kingdom Intellectual Property Office, "Examination Report under Section 18(3)" dated Aug. 5, 2021, in connection with Patent Application No. GB 1906212.4, 3 pages.

European Patent Office, "Supplementary European Search Report" dated May 13, 2022, in connection with European Patent Application No. 20799331.2, 10 pages.

* cited by examiner

METHOD AND APPARATUS FOR TRANSMITTING DATA TO A NETWORK NODE IN A WIRELESS COMMUNICATION SYSTEM

CROSS-REFERENCE TO RELATED APPLICATION

This application is based on and claims priority under 35 U.S.C. § 119(a) United Kingdom patent application number 1906212.4, filed on May 2, 2019, in the Intellectual Property Office of the United Kingdom, the disclosure of which is incorporated by reference herein in its entirety.

BACKGROUND

1. Field

The disclosure relates to techniques for routing data in relay networks, particularly in wireless relay networks. Certain embodiments of the disclosure are applied to Integrated Access and Backhaul (IAB). In particular, certain embodiments relate to IAB routing for a New Radio (NR) air interface of a wireless communication network, such as has been proposed for Fifth Generation (5G) wireless communication networks.

2. Description of Related Art

Wireless or mobile (cellular) communications networks in which a mobile terminal (UE, such as a mobile handset) communicates via a radio link with a network of base stations, or other wireless access points or nodes, have undergone rapid development through a number of generations. The 3rd Generation Partnership Project (3GPP) design, specify and standardize technologies for mobile wireless communication networks. Fourth Generation (4G) systems are now widely deployed.

3GPP standards for 4G systems include an Evolved Packet Core (EPC) and an Enhanced-UTRAN (E-UTRAN: Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardize Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of NR is the use of wireless backhaul to reduce network deployment costs and enhance network flexibility by allowing for the topology of the network to be reconfigured. For a conventional wireless communication network, such as LTE, base stations (referred to in LTE as enhanced Node Bs, eNBs) via connected to the core network via wired backhaul (BH) links. The base stations are responsible for communicating with mobile devices wirelessly such that those devices may access the core network. Alternatively, a base station may be connected to a core network via a dedicated point-to-point wireless link, quite separate from the process of allowing a device to wirelessly access the base station. As part of NR it is proposed that access for devices to the core network and wireless backhaul may be integrated, which may be referred to as Integrated Access and Backhaul (IAB). This may also be referred to as self-backhauling where the UE access and backhaul share the same wireless channel. It will be appreciated that routing for IAB presents challenges that have not been fully resolved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide method and apparatus for addressing the issue of routing for relay networks including for IAB.

Additional aspects will be set forth in part in the description which follows and, in part, will be apparent from the description, or may be learned by practice of the presented embodiments.

In accordance with an aspect of the disclosure, a method of operating a first node in a wireless communication network is provided. The method comprises: receiving an ingress data packet; determining a next hop node for the ingress data packet; and transmitting the ingress data packet to the determined next hop node; wherein determining the next hop node for the ingress data packet takes account of first level routing information indicating target next hop nodes.

In an embodiment, the first node comprises an integrated access backhaul, IAB, node arranged to communicate backhaul traffic wirelessly with at least one of a parent node and a child node and handle local access traffic; and wherein the ingress data packet comprises an ingress IAB data packet.

In an embodiment, the ingress IAB data packet is received from an uplink or downlink node or is generated at the IAB node from local access data.

In an embodiment, determining the next hop node for the ingress data packet comprises determining the next hop link from a routing table.

In an embodiment, for downlink communication the first level routing information comprises, for each target next hop node for the downlink, at least one of: a cell-radio network temporary identifier, C-RNTI, of the next hop node; a C-RNTI of the next hop node combined with a cell identifier or a cell group identifier of a cell supported by the first node to which the next hop node attaches; or a relaying specific address.

In an embodiment, for uplink communication the first level routing information comprises, for each target next hop node for the uplink, a cell identifier or a cell group identifier of a cell supported by the next hop node to which the first node attaches.

In an embodiment, the first level routing information in the routing table is statically assigned; or wherein the first level routing information is dynamically assigned according to whether the relaying specific address is shorter than the C-RNTI or the C-RNTI combined with the cell identifier or the cell group identifier.

In an embodiment, the relaying specific address comprises an IAB specific address.

In an embodiment, the decision on which identifier to use takes into account the signaling incurred by required reconfiguration.

In an embodiment, after determining a next hop node the method further comprises determining a channel on which to transmit the ingress data packet; wherein determining the channel on which to transmit the ingress data packet takes account of second level routing information; and wherein the second level routing information comprises, for downlink IAB communication, at least one of: a logical channel identifier; a radio link control identifier; an IAB entity identifier; or a unique identifier assigned to each channel by a central entity.

In an embodiment, the second level routing information is used in combination with the first level routing information, or on its own in the event that first level routing information is not required due to there being only a single target next hop node in the egress direction.

In an embodiment, determining a next hop node for the ingress data packet or determining a channel for the next hop node comprises determining a next hop node or channel according to at least one of: a UE bearer identifier; UE bearer QoS requirements; current status of egress backhaul, BH, links; or feedback received from child nodes on any downstream congestion or from parent nodes on any upstream congestion.

In accordance with an aspect of the disclosure, a method of operating a first node in a wireless communication network is provided. The method comprises: receiving an ingress data packet; determining, for a target next hop node, a channel on which to transmit the ingress data packet; and transmitting the ingress data packet to the target next hop node on the determined channel; wherein determining the channel on which to transmit the ingress data packet takes account of second level routing information.

In an embodiment, the second level routing information comprises, for downlink IAB communication, at least one of: a logical channel identifier; a radio link control identifier; an IAB entity identifier; or a unique identifier assigned to each channel by a central entity.

In an embodiment, the target next hop node is identified through signaling received by the first node, or pre-configured, or only a single next hop node is available; or wherein the method further comprises determining the target next hop node for the ingress data packet, taking account of first level routing information indicating target next hop nodes.

In accordance with an aspect of the disclosure, a node in a wireless communication network is provided. The node is arranged to execute: the method.

In accordance with an aspect of the disclosure, a computer readable storage medium having stored thereon computer executable instructions is provided. When executed by a computer, the computer executable instructions cause the computer to: receive an ingress data packet, determine a next hop node for the ingress data packet, and transmit the ingress data packet to the determined next hop node, wherein determining the next hop node for the ingress data packet takes account of first level routing information indicating target next hop nodes A further aspect provides a computer program comprising the computer executable instructions.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
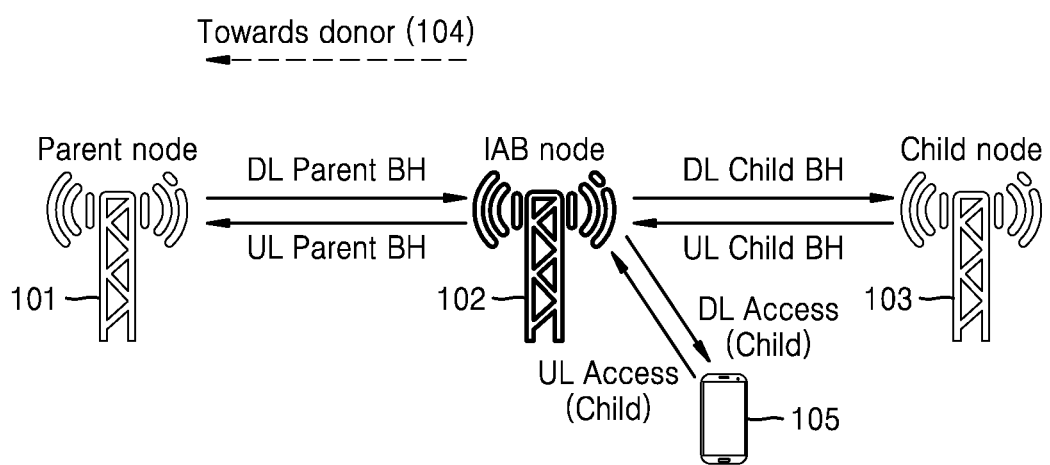
FIG. 1 illustrates an arrangement of three IAB nodes, according to an embodiment of the disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the disclosure will now be described in the context of a 5G wireless communication network, and in particular a NR radio access network forming part of a 5G wireless communication network. It will be understood that the disclosure is not limited to any particular radio access technology. That is, the concept of IAB where backhaul traffic and network access traffic share a transmission frame is equally applicable in other wireless communication systems where it is desirable to deploy base stations with wireless backhaul. Additionally, many of the routing methods that the disclosure claims are not limited to a relay network where access and backhaul share frequencies (as is the case in IAB), but to more general wireless transport networks. That is, while certain of the embodiments set out below are in the context of Integrated Access and Backhaul (IAB) relay networks, the claims are not so limited nor should they be construed to be. In particular, the concepts described herein are suited to other forms of wireless relay nodes without the additional features of access and backhaul sharing frequencies. References to particular 3GPP constructs in certain embodiments should not be understood as limiting the ability of the disclosure to be applied to other wireless communication networks.

3GPP Technical Report TR 38.874 v16.0.0 dated 10 Jan. 2019 and available at https://portal.3gpp.org/#/55936-specifications bears the title "Study on Integrated Access and Backhaul" and provides a detailed discussion of the various implementation options of IAB (without mandating any normative solutions) which may form the background of the disclosure. Its contents are incorporated herein by reference.

A key benefit of IAB is enabling flexible and dense deployment of NR cells without requiring a proportional increase in wired or point to point wireless backhaul links to the core network. The principles of IAB will now be described in greater with reference to FIG. 1 which is reproduced from 3GPP TR 38.874, specifically FIG. 7.3.1-1, and illustrates different IAB link types. In IAB within a wireless communication network, an IAB node may be connected to one or more parent nodes and one or more child nodes, which themselves may be IAB nodes. That is, each IAB node is allowed to have multiple child nodes and multiple parent nodes. Each IAB node comprises a Distributed Unit (DU) which permits radio access by a device to the network, together with a Mobile Termination (MT) part which performs backhaul communications to communicate access data with the core network. The structure of an IAB node including a DU and an MT is described in greater detail below in connection with FIG. 2.

FIG. 1 illustrates three nodes: a parent node 101, an IAB node 102 and a child node 103. It will be appreciated that each of nodes 101 to 103 may be identical IAB nodes and that the notations "parent" and "child" in FIG. 1 are relative only to a particular IAB node (in this case, node 102). That is, for child node 103, its parent node is node 102 and its child node (if present) is not illustrated, but logically would appear to the right in the arrangement of FIG. 1. As an exception to this, for each IAB chain of nodes there will be a first node which has a wired or dedicated wireless connection to the core network, and this node may be referred to as a donor node. A donor node does not have a parent node, but acts as the parent node in respect of its child node (or each of its child nodes if it has multiple child nodes). A further exception is that there will be at least one IAB node which does not have a backhaul connection to any subsequent child node. FIG. 1 does not illustrate a donor node, but logically it would appear to the left of the arrangement of FIG. 1 as indicted by arrow 104. As noted above, a further exception is that an IAB node may have more than one child node and more than one parent node. The IAB routing techniques disclosed herein apply equally to an IAB node having more than one child node and/or more than one parent node.

FIG. 1 further illustrates an access device 105 wirelessly communicating with IAB node 102. Equally, further access devices may wirelessly communicate with nodes 101 and 103. For the particular example of IAB node 102, this topology results in backhaul (BH) downlink (DL) and uplink (UL) communications with the parent node 101 and the child node 103, and access DL and UL communications with the mobile device 105.

As disclosed in 3GPP TR 38.874, section 5.2.1, IAB may enable multi-hop backhauling, providing greater range extension than a single hop, which is particularly desirable where frequencies above 6 GHz are used due to their limited range. The maximum number of hops may be constrained by frequency, cell density, propagation environment, and traffic load. These factors may be expected to change over time. From the architecture perspective, flexibility in hop count is therefore desirable. Furthermore, section 5.2.2 discloses that wireless backhaul links are vulnerable to blockage, for instance due to moving vehicles and changes in vegetation or the built environment. It will be appreciated therefore that network topology adaptation is desirable, which creates challenges for routing in IAB.

Figure 6:
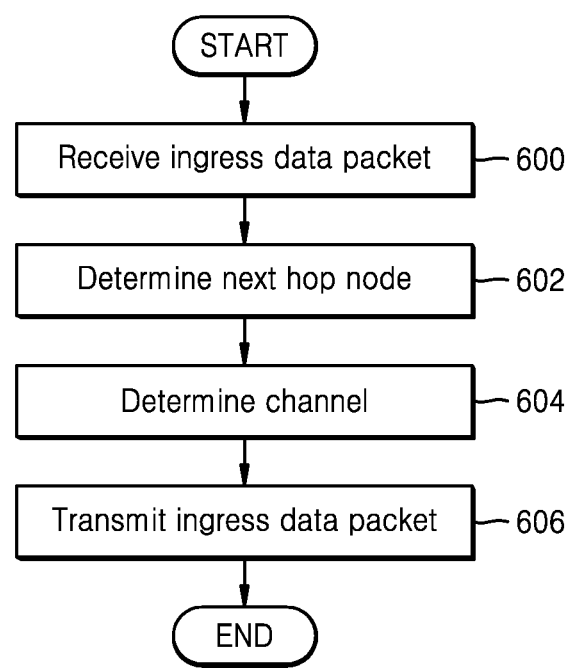
FIG. 6 illustrates a flowchart for an embodiment of the disclosure.

3GPP TR 38.874, section 6 provides a detailed disclosure of the architecture of IAB. 3GPP TR 38.874, FIG. 6.1.1-1 (not reproduced herein) in particular shows an IAB architecture in which each IAB node has a single parent node feeding back to a IAB donor, and optionally one or more child nodes, generally corresponding to FIG. 1 of the disclosure. 3GPP TR 38.874, FIG. 6.1.2-1, parts (b) and (c) (not reproduced herein) disclose alternatives whereby multiple parent nodes for an IAB node are possible.

3GPP TR 38.874, section 6.2 proposes multiple different IAB architectures which can be represented by five architecture reference diagrams detailed in sections 6.3 and 6.4. At the start of the normative phase of IAB work in 3GPP (December 2018), architecture 1a (alternatively referred to as option 1a) was selected. This is illustrated in 3GPP TR 38.874 FIG. 6.3.1-1, reproduced as FIG. 2 for the present patent specification, and described in 3GPP TR 38.874 section 6.3.1.

Figure 2:
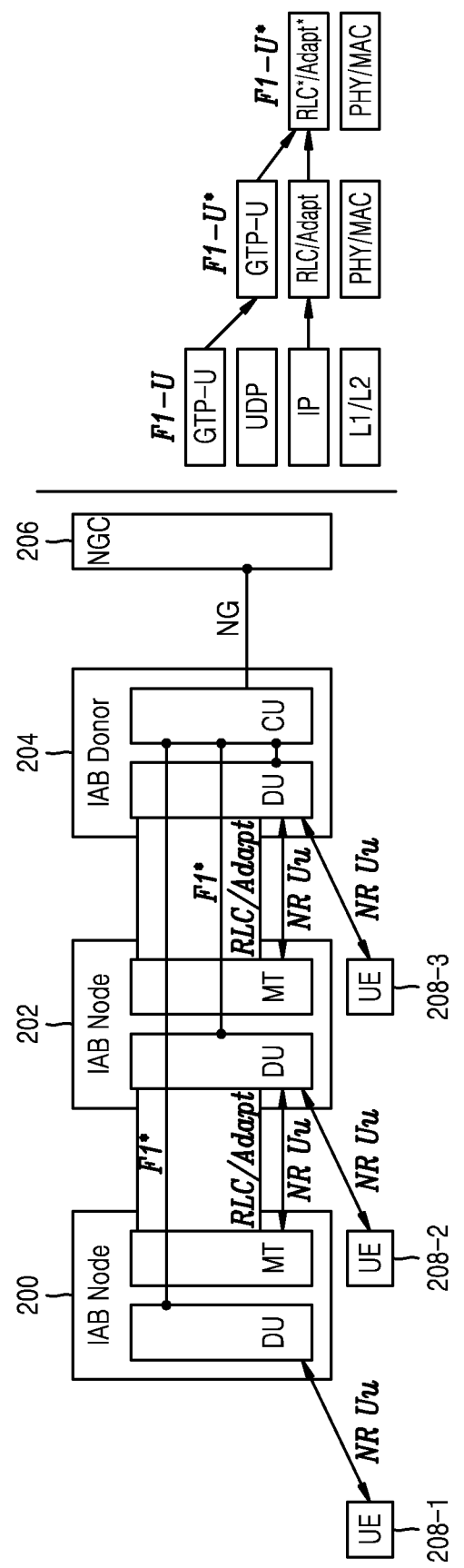
FIG. 2 illustrates an IAB architecture reference diagram, according to an embodiment of the disclosure.
Figure 3:
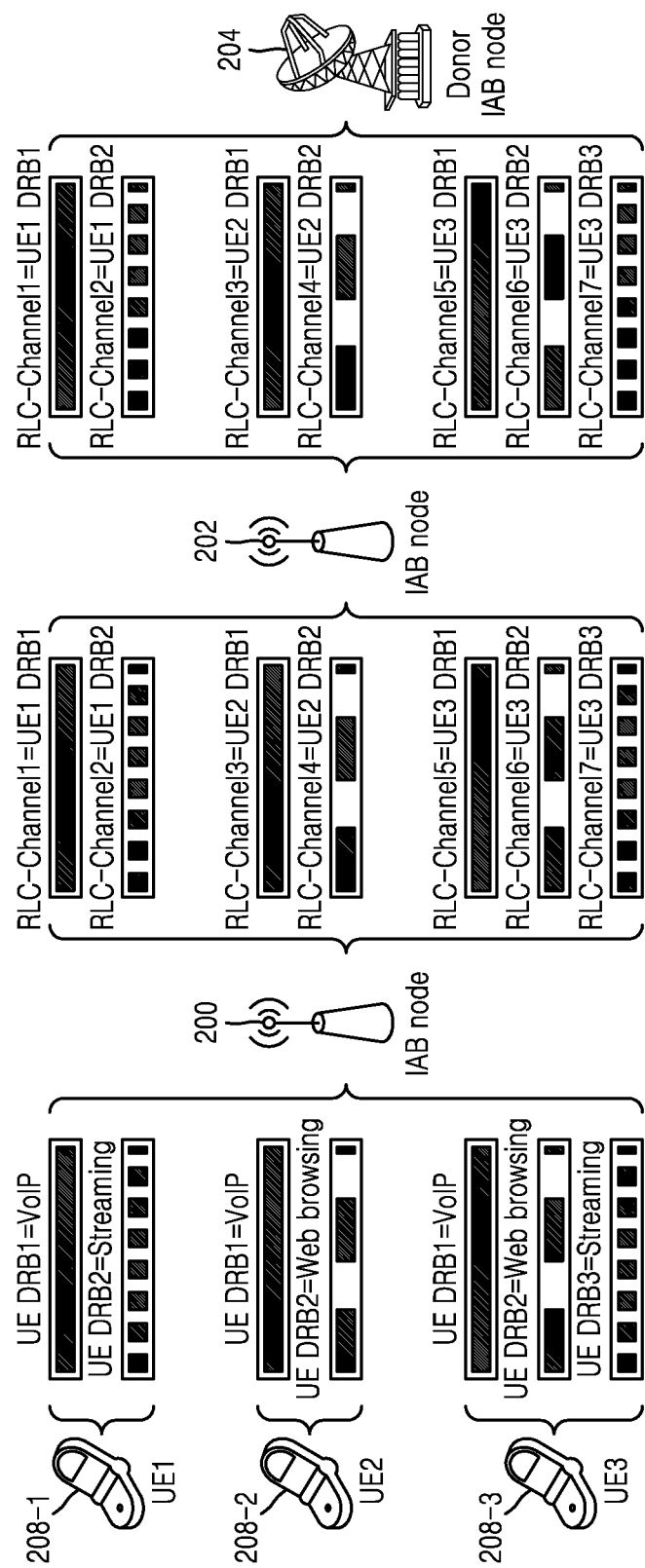
FIG. 3 illustrates a one-to-one mapping between UE DRBs and BH RLC channels, according to an embodiment of the disclosure.
Figure 4:
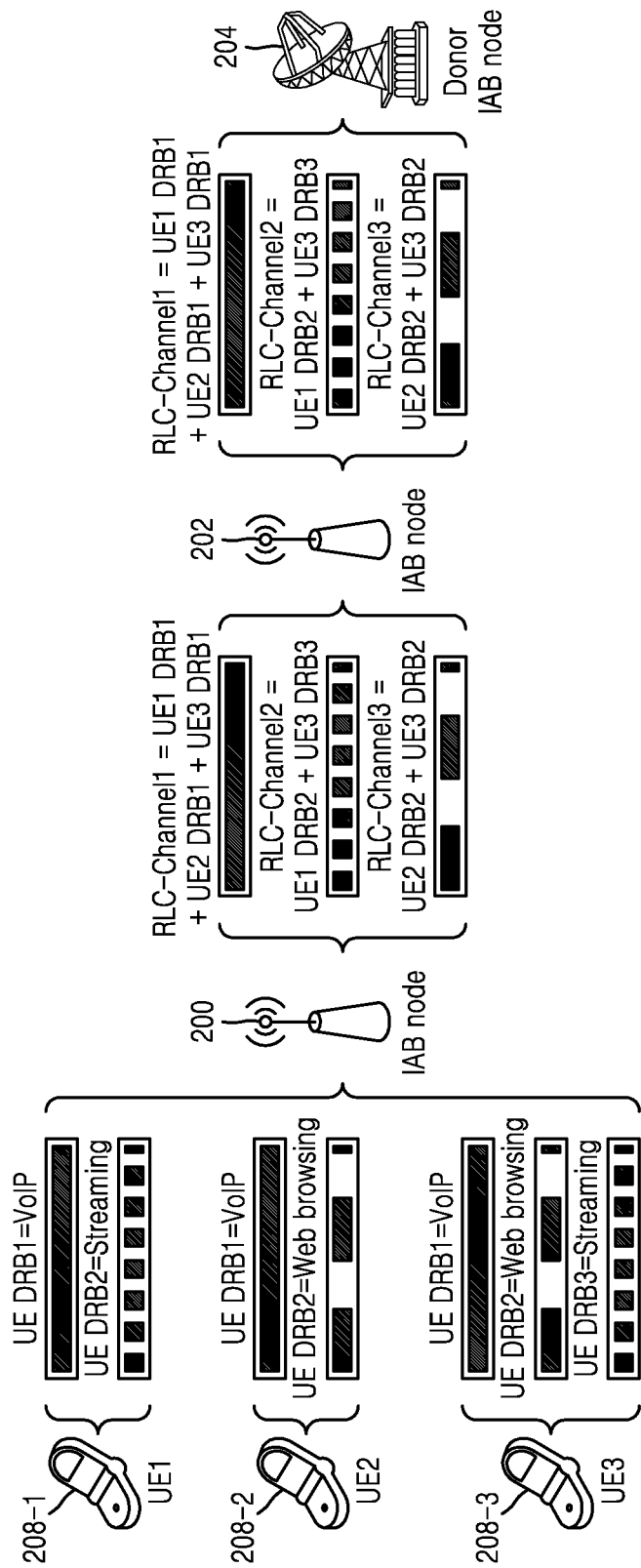
FIG. 4 illustrates a many-to-one mapping between UE DRBs and BH RLC channels, according to an embodiment of the disclosure.

FIG. 2, illustrating architecture 1a, shows two IAB nodes 200, 202 and a IAB donor 204 which is connected to the core network (NGC) 206. Each IAB node 200, 202 or IAB donor 204 may allow access to UEs 208-1 to 208-3 respectively, across the NR air interface Uu. Architecture 1a leverages the Centralized Unit/Distributed Unit (CU/DU) split architecture of a 5G base station (gNB). FIG. 2 shows the reference diagram for a two-hop chain of IAB nodes 200, 202 underneath an IAB donor 204, where IAB nodes 200, 202 and UEs 208-1 to 208-3 connect in standalone (SA) mode to the NGC 206. Each IAB node 200, 202 holds a DU and a Mobile Termination (MT). Via the MT, each IAB node 200, 202 connects to an upstream IAB node 202 or the IAB donor 204 across the NR air interface Uu in the same manner as a UEs 208-1 to 208-3. Via the DU, IAB nodes 200, 202 or the IAB donor 204 establishes radio link control (RLC) channels to UEs 208-1 to 208-3 respectively, and to MTs of downstream IAB nodes 200, 202. For MTs, this RLC channel may refer to a modified RLC*. IAB nodes 200, 202 can connect to more than one upstream IAB node or IAB donor DU.

The IAB donor 204 also holds a DU to support UEs and MTs of downstream IAB nodes 200, 202. The IAB donor 204 holds a CU for the DUs of all IAB nodes 200, 202 and for its own DU. It is assumed that the DUs on IAB nodes 200, 202 are served by only one IAB donor, but this IAB-donor may change through topology adaptation. Each DU on IAB nodes 200, 202 connects to the CU in the IAB-donor using a modified form of the F1 interface (carrying traffic passing to the core network NGC 206), which is referred to as F1*. F1*-U runs over RLC channels on the wireless backhaul between the MT on the serving IAB-node and the DU on the donor.

Architecture 1a adds an adaptation layer to the protocol stack above the RLC protocol layer, labeled RLC/Adapt in FIG. 2, which holds routing information, enabling hop-by-hop forwarding. The adaptation layer was renamed Backhaul Adaptation Protocol (BAP) at the 3GPP RAN2 working group meeting 105-Bis in Xi'an, China in April 2019. Information carried on the adaptation layer may support the following functions: identification of the UE-bearer for the Protocol Data Unit (PDU); routing across the wireless backhaul topology; QoS-enforcement by the scheduler on DL and UL on the wireless backhaul link; and mapping of UE user-plane PDUs to backhaul RLC channels. The adaptation layer replaces the IP functionality of the standard F1-stack (left-hand stack), as illustrated in the modification to the protocol stack shown in the right-hand side of FIG. 2, including two alternative F1*-U protocol stacks (the middle and right-hand stacks). The main purpose of BAP is to transport F1*-U across the wireless backhaul. F1*-U may carry a General Packet Radio System (GPRS) Tunneling Protocol (GTP) User plane (GTP-U) header for the end-to-end association between CU and DU. In a further enhancement, information carried inside the GTP-U header may be included into the adaption layer. In FIG. 2, enhancements of RLC are referred to as RLC*.

As disclosed in 3GPP TR 38.874, section 8.2.4.1, an IAB node needs to multiplex UE Data Radio Bearers (DRBs) to Backhaul (BH) RLC Channels. FIG. 8.2.4.1-1 of 3GPP TR 38.874 (reproduced herein as FIG. 3) illustrates a first option whereby there is a one-to-one mapping between UE DRBs and BH RLC channels, and for subsequent hops each BH RLC channel is mapped onto a separate BH RLC channel. However, multiple BH RLC channels may be multiplexed logically into a single BH logical channel, in which case identifiers for the UE and/or DRB may be required.

FIG. 8.2.4.1-2 of 3GPP TR 38.874 (reproduced herein as FIG. 4) illustrates a second option in which there is a many-to-one mapping between UE DRBs and BH RLC channels. That is, several UE DRBs may be multiplexed onto a single BH RLC channel, for instance grouping DRBs with similar Quality of Service (QoS) requirements. Each IAB node can multiplex UE DRBs into a single BH RLC channel even if they belong to different UEs. Furthermore, a packet from one BH RLC channel may be mapped onto a different BH RLC channel on the next hop. Since the BH RLC channel multiplexes data from/to multiple bearers, and possibly even different UEs, each data block transmitted in the BH RLC channel needs to contain an identifier of the UE, DRB, and/or IAB node it is associated with.

In accordance with certain embodiments of the disclosure, each IAB node may decide how to map UE DRBs to BH RLC channels, or this mapping may only be performed once and then be replicated for following hops. This mapping or multiplexing may be performed at the adaptation layer.

Implementation of the adaptation layer may present significant challenges for routing. At the 3GPP RAN2 working group meeting 105 in Athens, Greece in February/March 2019, the following broad principles were agreed:

That the IAB donor CU configures the adaptation layer. This means that signaling of adaptation layer parameters, assignment of adaptation layer address, and routing tables originates from the CU; it is still to be decided whether all the related decisions on parameter values are made in the CU, or if some degree of local decision-making is supported.

That routing and bearer mapping (e.g. mapping of BH RLC channels) are adaptation layer functions, though the detail of routing functionality (e.g. what is configured versus what is decided locally) was left for further study.

At the 3GPP RAN2 working group meeting 105-Bis the following agreements were additionally made:

Routing delivers a packet to a destination node by selecting a next backhaul link among given multiple backhaul links at an IAB node and an IAB donor node.

"Destination IAB node/IAB donor-DU address" and "Specific path identifier" (carried in the BAP packet header) are candidates for route identifiers for routing at the adaptation layer. Additional required information for routing was left for further study.

"Destination IAB node/IAB donor-DU address" and/or "Specific path identifier" is unique within an IAB donor-CU.

In order to implement adaptation layer routing, in accordance with certain embodiments, IAB nodes (including the IAB donor DU) implement a routing table which specifies how, for an incoming BAP protocol packet, which outgoing (egress) BH RLC channel should be selected. The use of a routing table applies equally to the uplink (towards the IAB donor) and the downlink (towards the target UE). Following the considerations set out above in connection with FIGS. 2 to 4 of the disclosure, even where there is a single parent node or a single child node towards which the outgoing BAP packet will be directed, there may still be a choice of RLC channel. The choice of egress channel may be based on the ingress channel. The choice of egress channel may also be based on a UE bearer ID.

Certain embodiments of the disclosure address the issue of how a routing table may be structured, in particular what form of identifier or identifiers should be used to uniquely identify the egress link (that is, the next hop link).

For the downlink, the next hop leads to a child node and this child node (like any UE) will have a Cell Radio Network Temporary Identifier (C-RNTI), where the C-RNTI identifies the MT part of the node. However, using a C-RNTI alone may not suffice in the event that there are multiple RLC channels (BH channels) extending to the child node. For the uplink, the next hop leads to a parent node which appears to the current IAB node as a gNB.

According to an embodiment of the disclosure, the routing table is constructed to differentiate between different child nodes (on the downlink) or different parent nodes (on the uplink). For the downlink, the routing table may include the next-hop node information: this may be referred to as first level, or node level routing information. As an example, if on the downlink, a parent node has two child nodes, these two child nodes can be considered as equivalent to two different UEs accessing the parent node. To differentiate between the two child nodes, the routing table held by the parent node can use the C-RNTI applied to each child node.

However, it will be appreciated that a single IAB node may support multiple cells, meaning that using C-RNTI as the first level routing information may not in this case uniquely identify a child node. In order to accommodate a situation in which C-RNTI does not uniquely identify a child node, in accordance with an embodiment of the disclosure, a cell identifier/cell group identifier of the specific cell/cell group supported by the IAB node in question to which the child node attaches may be used in conjunction with the C-RNTI in order to uniquely identify a child node. In an embodiment, the child node may also be uniquely identified by its BAP address, comprising an IAB specific address, where a BAP address is used for routing. BAP addresses may be mapped to particular nodes as part of the IAB donor CU configuration of the BAP layer.

As noted above, it is possible to uniquely identify the next-hop node by using its BAP address. In this case, however, it will be appreciated that ultimately the BAP address would at some point need to be converted to the relevant radio identifiers, with some consequent redundant processing when BAP address is used. However, if the BAP address is shorter than C-RNTI (optionally with cell id), then its use may allow more compact routing tables and a reduction in signaling. Therefore, on the downlink, if BAP address is chosen as the next-hop node unique identifier, the redundant procedural aspects may (or, should) be weighed against the potential reduction in routing table size and relevant signaling to determine if this implementation option is desirable.

However, this use of first level routing information may not tell us which of multiple BH RLC channels on the parent-child link the incoming BAP protocol packet should be assigned to (this is referred to in the discussion below as second level, or BH RLC channel level routing information).

For the uplink, the routing table may also include the next-hop node information, again referred to as first level, or node level routing information. Commonly, for the uplink there may be only one parent node (which may be referred to as a tree topology). In a tree topology no specific first level routing information may be needed for the parent node, though as for the downlink second level routing information may be required to identify a particular BH RLC channel, as described below. However, it will be appreciated that a current node for which a routing table is generated may be connected to a Master Cell Group (MCG) and a Secondary Cell Group (SCG). In that situation, first level routing information may be used for the uplink. Specifically, a cell identifier/cell group identifier may be used for the uplink. For example, this may be the inverse of the situation described for downlink IAB routing in the paragraphs above.

The next-hop identifier provided by the first level routing information for the downlink or the uplink may be statically assigned by the IAB donor CU. Or, in an embodiment, the following selection method may be applied:

If all IAB nodes only support or deploy single-cell mode (or a single group of cells) then C-RNTI can be used within the routing table as first level routing information for the downlink case.

If the BAP address is shorter than the C-RNTI (or C-RNTI+cell id/cell group id, where needed), then BAP address can be used within the routing table as first level routing information.

If the IAB network has a tree topology then no first level routing information (next hop identifier) is used on the uplink. If the IAB node has more than one parent then cell id/cell group id can be used, or alternatively BAP address, based on similar considerations as above.

In an embodiment, the above selection mechanism can also be used in a semi-static way, by switching between using different identifiers, based on changes in topology and network configuration. It will be appreciated that this switching may be triggered by signaling between the CU at the IAB donor and the IAB nodes/donor DU, causing the reconfiguration of routing tables at each IAB node. By switching between using different identifiers, when C-RNTI (or C-RNTI+cell id/cell group id, where needed) is used to identify the next-hop, redundant operation of converting BAP address to relevant radio link identifiers can be eliminated, and when BAP address is used to identify the next-hop, compact routing tables (or, compact routing information) and reduction in signaling load can be achieved (for example, signaling overhead is prevented).

The embodiments of the use of first level routing information and related use of at least one of C-RNTI, cell ID, cell group ID, or BAP address may be different from procedure for small cells. For small cells, there may be no decision to be made as to which parent or which child node to send data to. Small cells scenario may be a simple single-hop scenario, with the backhaul often using fixed broadband, and sometimes wireless connection to a macro-cell. However, even in the case of small cells scenario with wireless backhaul, there may be no routing nor use of the identifiers in routing tables. In small cell systems, some identifiers may be used purely for PHY layer connectivity, whereas in IAB system other identifiers may be additionally used in routing tables, mapped to a specific route/path, for example, based on QoS considerations/notification from parent nodes, etc.

While the option of second level, or BH RLC channel level routing information for determining between different BH RLC channels is noted above, according to certain embodiments (depending on a specific implementation) specific BH RLC channels may not form part of the routing table maintained at an IAB node. Instead, mapping information (e.g., mapping table) of a BH RLC channel may be provided by the IAB donor CU when configuring the BH RLC channel, in which case only first level routing information for egress channel identification may be used within an IAB node routing table.

However, where an IAB node must select a particular BH RLC channel for BAP packet egress (and not merely identify the next node), according to an embodiment of the disclosure the routing table contains second level, or BH RLC channel level routing information for egress channel identification.

For both the downlink and the uplink, second level, or BH RLC channel level routing information may take one of the following forms:

Option 1. Logical Channel Identifier (LCID). Each logical BH channel may be assigned a unique logical identifier.

Option 2. RLC entity identifier. This may correlate to the LCID if there is a one to one mapping between RLC entities and logical channels. However, a new RLC ID could be introduced, potentially reducing the size needed to identify the BH RLC channel.

Option 3. A BAP entity identifier. Advantageously, this assist in keeping similar data types together. More specifically, this can be used in case of N:1 mapping between bearers and BH RLC channels if needed to indicate a remapping of incoming bearers by indicating a joint BAP entity id for bearers who perhaps did not come at the same ingress BH RLC channel.

Option 4. Every BH RLC channel has a unique number maintained centrally. This offers simplicity and reduces the processing load at an IAB node, but at the expense of additional signaling and redundancy. In particular, reconfiguration may require a large signaling overhead in the event that a node is added or a link fails.

In an embodiment of the disclosure, the mapping table (as an example of information in the mapping information) may contain the following entries: ingress BH RLC channel, BAP destination address, (these two are inputs), egress BH RLC channel identified by the C-RNTI and LCID (this is the output). In another embodiment of the disclosure, the mapping table may contain the following entries: ingress BH RLC channel, UE bearer ID, BAP destination address, (these three are inputs), egress BH RLC channel identified by the C-RNTI and a BAP identifier (this is the output). In another embodiment of the disclosure, the mapping table may contain the following entries: ingress BH RLC channel, UE bearer ID, BAP destination address, (these three are inputs), the QoS profile of the UE bearer (hosted in the node—also an input), egress BH RLC channel identified by the C-RNTI and an LCID identifier (this is the output). By using the mapping table, potentially more compact routing table and significant signaling reduction can be achieved, since, for example, the routing table may need to be configured by the CU and sent to the nodes. In addition, by using the mapping table, when a node connects to a new parent node, routing tables may not need to be updated for the node (or, the new parent node), since, for example, BAP addresses of the node's (or, the new parent node's) child nodes remain the same or only updating of the mapping between BAP addresses and C-RNTI may be needed.

While particular embodiments of the disclosure envisage the use of a routing table at a IAB or relay node, it will be appreciated that a table per se is not essential to the implementation of the disclosure, so long as account is taken of the first and/or second level routing information as required.

Particular methods for choosing a next hop (in addition to the identification of a next hop within a routing table) will now be described in accordance embodiments of the disclosure. The next hop node (and/or the specific BH RLC channel) can be chosen based on one or more of the following criteria:

UE bearer identifier (which may for instance be included in a BAP header).

UE bearer QoS requirements.

Current status of egress BH links (for traffic control purposes).

Feedback received from child nodes on any downstream congestion or from parent nodes on any upstream congestion.

Figure 5:
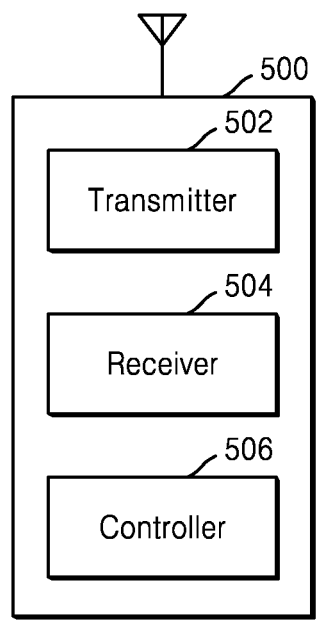
FIG. 5 illustrates a structure of an IAB node as a relay node, according to an embodiment of the disclosure.

FIG. 5 provides a schematic diagram of the structure of an IAB node 500 which is arranged to operate in accordance with the embodiments described above. The IAB node 500 includes a transmitter 502 arranged to transmit signals to a parent node, a child node or an access device; a receiver 504 arranged to receive signals from a parent node, a child node or an access device; and a controller 506 arranged to control the transmitter and receiver and to perform processing such as in accordance with the above described methods.

Although in FIG. 5 the transmitter, receiver, and controller have been illustrated as separate elements, any single element or plurality of elements which provide equivalent functionality may be used to implement the embodiments of the disclosure described above.

The embodiments described above refer to both first level routing information and second level routing information. While there may frequently be a requirement for both to be applied (where a target node must be selected and then a particular channel to that target node selected) it will be understood that there may be situations in which only one type of routing information is required. For instance, if there is only a single target node (or the target node is preconfigured) then only the second level routing information for identifying a channel may be required. Alternatively, first level routing information may be required to select a target node, but then there may be no option of channel.

Referring now to FIG. 6, this is a flowchart illustrating a method of operating a first node (such as an IAB node) for relaying ingress data packets. At step 600 an ingress data packet is received. At step 602 a determination of a next hop node for the ingress data packet is made. The determination takes account of the first level routing information described above. At step 604 a determination is made of a channel to the determined next hop mode on which to transmit the ingress data packet. This determination takes account of the second level routing information described above. At step 606 the ingress data packet is transmitted to the determined next hop node on the determined channel. It will be appreciated, according to the considerations of the previous paragraph, that either step 602 or step 604 may be omitted in some situations.

Figure 7:
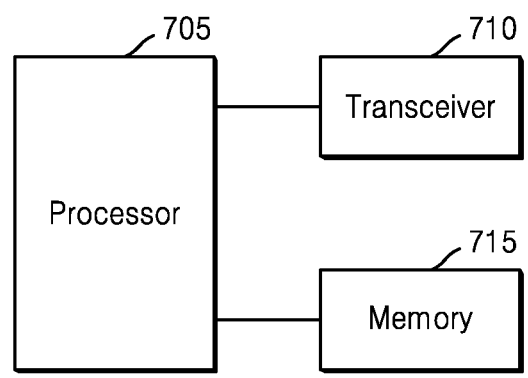
FIG. 7 illustrates a node according to an embodiment of the disclosure.

FIG. 7 illustrates a node according to an embodiment of the disclosure.

The network nodes described above may correspond to the node illustrated in FIG. 7. For example, the IAB node 500 illustrated in FIG. 5 may correspond to the node illustrated in FIG. 7.

Referring to the FIG. 7, the node may include a processor 705, a transceiver 710 and a memory 715. However, all of the illustrated components are not essential. The node may be implemented by more or less components than those illustrated in FIG. 7. In addition, the processor 705 and the transceiver 710 and the memory 715 may be implemented as a single chip according to another embodiment.

The aforementioned components will now be described in detail.

The processor 705 may include one or more processors or other processing devices that control the proposed function, process, and/or method. Operation of the node may be implemented by the processor 705.

The transceiver 710 may include a RF transmitter for up-converting and amplifying a transmitted signal, and a RF receiver for down-converting a frequency of a received signal. However, according to another embodiment, the transceiver 710 may be implemented by more or less components than those illustrated in components.

The transceiver 710 may be connected to the processor 705 and transmit and/or receive a signal. The signal may include control information and data. In addition, the transceiver 710 may receive the signal through a wireless channel and output the signal to the processor 705. The transceiver 710 may transmit a signal output from the processor 705 through the wireless channel.

The memory 715 may store the control information or the data included in a signal obtained by the node. The memory 715 may be connected to the processor 705 and store at least one instruction or a protocol or a parameter for the proposed function, process, and/or method. The memory 715 may include read-only memory (ROM) and/or random access memory (RAM) and/or hard disk and/or CD-ROM and/or DVD and/or other storage devices.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the disclosure may also be implemented via computer executable instructions stored on a computer readable storage medium, such that when executed cause a computer to operate in accordance with any other the aforementioned embodiments.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the disclosure, which is defined in the accompanying claims.

While the disclosure has been described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating a first node in a wireless communication network, the method comprising:
   receiving a data packet;
   receiving a routing information from an integrated access backhaul (IAB) donor node;
   receiving a mapping information from the TAB donor node;
   determining a next hop for the data packet, based on a backhaul adaptation protocol (BAP) address of the next hop comprised in the routing information;
   determining an egress radio link control (RLC) channel on which to transmit the data packet among a plurality of egress RLC channels, based on the mapping information including the BAP address of the next hop, an identifier (ID) of at least one ingress RLC channel and an ID of at least one egress RLC channel; and
   transmitting the data packet on the egress RLC channel to the next hop.

2. The method of claim 1, wherein the first node comprises an IAB node arranged to communicate backhaul traffic wirelessly with at least one of a parent node or a child node; and
   wherein the data packet comprises an IAB data packet.

3. The method of claim 2, wherein the IAB data packet is received from an uplink or downlink node.

4. The method of claim 1, wherein for uplink communication, the routing information further comprises, for each target next hop for an uplink, a cell identifier or a cell group identifier of a cell supported by the target next hop to which the first node attaches.

5. The method of claim 1, wherein for downlink communication the routing information comprises, for each target next hop for a downlink, at least one of:
   a cell-radio network temporary identifier (C-RNTI) of the target next hop;
   a C-RNTI of the target next hop combined with a cell identifier or a cell group identifier of a cell supported by the first node to which the target next hop attaches; or
   a BAP address of the target next hop.

6. The method of claim 5, wherein the BAP address of the target next hop comprises an IAB specific address.

7. The method of claim 5, wherein the routing information is dynamically assigned according to whether the BAP address of the target next hop is shorter than the C-RNTI or the C-RNTI combined with the cell identifier or the cell group identifier.

8. The method according to claim 7, further comprising deciding which identifier to use from among the C-RNTI or the C-RNTI combined with the cell identifier or the cell group identifier, based on signaling incurred by a required reconfiguration.

9. The method of claim 1, wherein the mapping information comprises a unique identifier assigned to each RLC channel by the IAB donor node.

10. The method of claim 1, wherein the determining of the next hop comprises:
determining the next hop according to at least one of:
current status of egress backhaul (BH) links; or
feedback received from child nodes on any downstream congestion.

11. A first node in a wireless communication network, the first node comprising:
a transceiver; and
at least one processor operably coupled with the transceiver, the at least one processor configured to:
receive, by controlling the transceiver, a data packet;
receive, by controlling the transceiver, a routing information from an integrated access backhaul (IAB) donor node;
receive, by controlling the transceiver, a mapping information from the IAB donor node:
determine a next hop for the data packet, based on a BAP address of the next hop comprised in the routing information;
determine an egress RLC channel on which to transmit the data packet from among a plurality of egress RLC channels, based on the mapping information including the BAP address of the next hop, an ID of at least one ingress RLC channel and an ID of at least one egress RLC channel; and
transmit, by controlling the transceiver, the data packet on the egress RLC channel to the next hop.

12. The first node of claim 11, wherein the mapping information comprises a unique identifier assigned to each RLC channel by the IAB donor node.

13. The first node of claim 11, wherein the processor is configured to determine the next hop according to at least one of:
current status of egress BH links; or
feedback received from child nodes on any downstream congestion.

14. A non-transitory computer readable storage medium comprising instructions that, when executed by a processor, cause a computer to:
receive a data packet;
receive a routing information from an integrated access backhaul (IAB) donor node;
receive a mapping information from the IAB donor node;
determine a next hop for the data packet, based on a BAP address of the next hop comprised in the routing information;
determine an egress RLC channel on which to transmit the data packet among a plurality of egress RLC channels, based on the mapping information including the BAP address of the next hop, an identifier (ID) of at least one ingress RLC channel and an ID of at least one egress RLC channel; and
transmit the data packet on the egress RLC channel to the next hop.

* * * * *